United States Patent Office 3,662,063
Patented May 9, 1972

3,662,063
METHODS FOR STIMULATING THE GROWTH OF POULTRY WITH COUMERMYCIN
Julius Berger, Passaic, and Wilbur Lewis Marusich, Wayne, N.J., assignors to Hoffmann-La Roche Inc., Nutley, N.J.
No Drawing. Continuation-in-part of application Ser. No. 742,506, July 5, 1968. This application Apr. 24, 1969, Ser. No. 819,525
Int. Cl. A61k 21/00
U.S. Cl. 424—181                                     5 Claims

ABSTRACT OF THE DISCLOSURE

A composition and method for stimulating the growth of poultry and enhancing feed efficiency is described. The composition comprises the known antibiotic, coumermycin, in admixture with an edible, non-toxic diluent or carrier, the diluent or carrier preferably being a material which is a nutrient for poultry.

The method comprises feeding poultry, ad libitum, a ration which contains a ratio of from about 1.0 gram to about 50.0 grams of coumermycin per ton of feed.

RELATED APPLICATION

This application is a continuation-in-part of U.S. patent application Ser. No. 742,506 filed July 5, 1968, now abandoned.

BRIEF SUMMARY OF THE INVENTION

The present invention provides compositions which contain the known antibiotic coumermycin as the active ingredient. The compositions are produced by uniformly distributing coumermycin throughout an edible, non-toxic diluent or carrier, the diluent or carrier preferably being a material having nutritional value to poultry. If desired, a mixture of coumermycin with N-methyl-glucamine or with a salt thereof with a medicinally acceptable acid can be employed. Additionally, the composition can contain as optional components other conventional feed additives, including but not limited to, antibiotics, hormones, enzymes, arsenicals, coccidiostats, etc.

The invention can be practiced in any one of several ways. For example, coumermycin alone or in admixture with N-methylglucamine or an acid addition salt thereof can be incorporated directly into a poultry feed and, by mixing, uniformly distributed throughout. In such an embodiment of the invention, the supplemented feed composition should contain a ratio of from about 1.0 gram to about 50.0 grams per ton of feed. In an alternate embodiment, the antibiotic can be added to an edible, non-toxic diluent, preferably a material having nutritional value, to provide a highly concentrated premix. The premix, in turn, is added to and uniformly distributed throughout the feed. A sufficient quantity of the premix is incorporated in the feed to provide a product containing a ratio of from about 1.0 gram to about 50.0 grams of coumermycin per ton of feed.

The invention serves to provide a coumermycin-supplemented poultry feed which, when ingested by poultry, ad libitum, stimulates their growth and enhances feed efficiency.

DETAILED DESCRIPTION

The invention provides compositions, i.e., concentrated premixes or poultry feeds, which contain the antibiotic coumermycin.

More particularly, the invention provides a method for stimulating the growth of poultry and enhancing feed efficiency.

The antibiotic coumermycin is well known in the art. It is produced by culturing Streptomyces hazeliensis var. hazeliensis nov. sp., an organism isolated with a sample of soil obtained in Matane, Gaspe, Canada. A culture of the organism has been deposited in the collection of microorganisms in the United States Department of Agriculture, Northern Utilization Research and Development Division, Peoria, Ill., under Reg. No. NRRL 2938.

Processes for producing the antibiotic described, for example, in Belgium Pat. No. 665,237, Dec. 10, 1965, result in a crude complex of antibiotic compounds. At least five active components and an inactive fraction can be isolated from this complex. Of the active components, the compound denoted coumermycin $A_1$ is the most active. Coumermycin $A_1$ has the following formula:

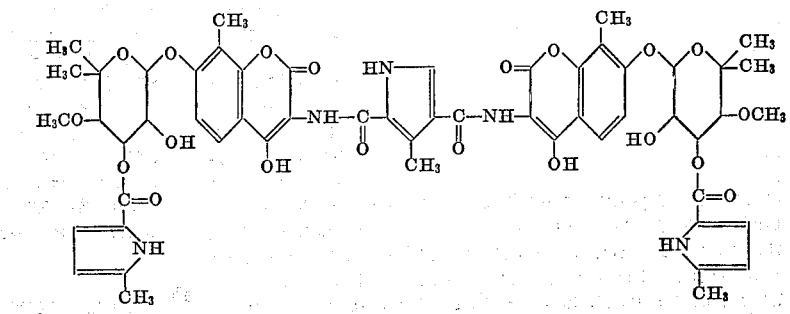

It has now been found that when poultry are allowed to feed, ad libitum, on a feed containing effective quantities of coumermycin, their growth rate is greatly enhanced. Additionally, it has been found that feed which contains coumermycin is more efficiently utilized by poultry so that, in comparison with a feed which is not supplemented with coumermycin, less feed is required to achieve a desired gain in weight.

As indicated heretofore, coumermycin may be utilized in the practice of the invention in any of a number of forms, e.g., purified, coumermycin may be utilized as the free acid or in the form of a salt with a pharmaceutically acceptable base, either alone or in admixture with N-methyl-glucamine, or as the dried crude fermentation broth. In general, any therapeutically active component of the coumermycin complex, or any mixture containing two or more such components can be employed. Such component or components can be employed in the form of a free acid or in the form of a salt of the free acid with a medicinally acceptable base. Thus, for example, in addition to coumermycin free acid, salts of coumermycin with alkali metals, such as sodium, potassium and lithium, can be used. In the paragraphs which follow hereinafter, the term coumermycin will be used to denote individually and collectively all of the active components of the coumermycin complex in the form of the free acid, in the form of salts thereof with a medicinally acceptable base and in the form of the dried crude fermentation broth. In the preferred embodiment of the invention, however, the compound which is now denoted as coumermycin $A_1$ is employed. Coumermycin $A_1$ can be employed in the form of the free acid or in the form of an alkali metal salt thereof, for example, the monosodium or disodium salt. The amount of coumermycin $A_1$ in mg./gram of solids in the dried crude fermentation broth may be easily calculated utilizing bioassay against an organism such as *Staphylococcus aureus*.

It may be convenient or expedient at times to use coumermycin in admixture either with N-methyl-glucamine free base or with a salt of N-methyl-glucamine with a medicinally acceptable acid. In general, an N-methyl-glucamine salt of any medicinally acceptable acid can be employed. Such acids, either inorganic or organic in nature, include, for example, hydrochloric acid, sulfuric acid, nitric acid, phosphoric acid, palmitic acid, stearic acid, etc. However, in those embodiments of the invention where coumermycin is used in conjunction with N-methyl-glucamine, the latter compound is preferably provided in the form of a free base. The quantity of N-methyl-glucamine base or N-methyl-glucamine salt used is not particularly critical. However, where coumermycin is used in admixture with N-methyl-glucamine or in admixture with an acid addition salt thereof, from about 0.1 part by weight to about 50 parts by weight of N-methyl-glucamine or N-methyl-glucamine salt will be provided for each part by weight of coumermycin present. In the paragraphs which follow hereinafter, it is to be understood that where the term coumermycin is used, it embraces not only the various active components of the coumermycin complex but also mixtures of such components with N-methyl-glucamine or a salt thereof.

The supplemented poultry feed compositions of the invention can be made simply by mixing coumermycin, homogenized dried crude coumermycin in fermentation broth or a concentrated premix which contains coumermycin with the ingredients which normally comprise a conventional poultry feed. The mixing step can be accomplished by methods known per se. In one such method, the nutrient materials which normally comprise a conventional poultry feed are charged, individually or collectively, into a batch mixer with coumermycin. The mixer is operated until a product is obtained which contains the various ingredients uniformly distributed throughout. In an alternate embodiment of the invention, a more concentrated product, for example, a premix containing coumermycin and an edible, non-toxic carrier or diluent, preferably a carrier or diluent having nutritional value, can be prepared simply by mixing coumermycin with the carrier or diluent. This premix can be diluted with a conventional poultry feed prior to being made available to the poultry for ingestion ad libitum. A preferred method of carrying out the invention involves the production of a concentrated premix by mixing coumermycin with a carrier or diluent which is edible and safe for oral ingestion by the poultry. The carrier or diluent which is used in producing this premix may itself be a nutrient for the poultry. However, the carrier or diluent need not have any nutritional value, it being sufficient that it is non-toxic when eaten by poultry. Subsequently, the coumermycin-containing premix is added to, and uniformly distributed throughout, a conventional poultry feed. The coumermycin-supplemented feed is subsequently made available to the poultry for feeding, ad libitum.

The coumermycin content of the aforementioned premix is not at all critical to the operability of the invention. The objectives of the invention will be achieved, regardless of the level of coumermycin in any particular premix, by using a quantity of premix to provide a final feed containing an effective level of coumermycin.

Although the quantity of coumermycin which is needed to achieve the requisite growth rate stimulation and the desired enhancement in feed efficiency is critical, the amount needed to achieve the desired results is variable. In general, as made available to poultry for feeding, there will be present in the coumermycin-supplemented poultry feed composition, a ratio of from about 1.0 gram to about 50.0 grams, preferably from about 5.0 grams to about 25.0 grams, of coumermycin, calculated as the free acid per ton of feed. Where a salt of coumermycin free acid is employed, a sufficient quantity of such salt is used to provide the equivalent of from about 1.0 to about 50.0 grams, preferably from about 5.0 grams to about 25.0 grams, of coumermycin free acid.

In addition to coumermycin and the nutrient material customarily found in poultry feeds, the compositions of this invention may contain other conventional poultry feed additives. These additives include, for example, antibiotics other than coumermycin as well as hormones, enzymes, arsenicals, coccidiostats, etc. The manner in which these materials, as well as other such additives, are incorporated into the compositions of this invention will be readily apparent to persons skilled in the art. In general, these additives are added to the feed and by mixing uniformly distributed throughout. The optional additives can be incorporated into the feed either prior or subsequent to the incorporation of coumermycin or the coumermycin-containing premix therein.

The present invention provides a distinct economic advantage to the poultry raiser. Primarily, it furnishes a means for increasing the growth rate of poultry. However, a secondary advantage resides in the fact that coumermycin enhances the effective utilization of ingested poultry feed. Thus, it has been found that poultry which are allowed to feed, ad libitum, on a coumermycin-supplemented feed, require less feed to reach a certain weight level than poultry which are allowed to feed on a ratio which does not include coumermycin.

For a fuller understanding of the nature and objects of this invention, reference may be had to the following examples which are given merely as further illustrations of the invention and are not to be construed in a limiting sense. All parts given in the examples are parts by weight unless otherwise indicated.

EXAMPLE 1

In this example, a basal ration was employed containing the following named ingredients in the quantities hereinafter indicated:

| | Percent by weight |
|---|---|
| Ground yellow corn | 56.075 |
| Meat and bone meal (50 percent protein) | 4.000 |
| Fish meal (60 percent protein) | 4.000 |
| Soybean meal (50 percent protein) | 28.000 |
| Dehydrated alfalfa meal | 1.000 |
| Animal fat | 4.000 |
| Methionine | 0.200 |
| Rock phosphate | 0.250 |
| Calcium carbonate | 1.200 |
| Iodized salt | 0.250 |
| Vitamin supplement | 1.000 |
| Trace mineral supplement | 0.025 |

The monosodium salt of coumermycin was added to this ration in a ratio of 50 grams of antibiotic per ton of ration.

The growth stimulating effects of coumermycin were determined by allowing poultry to feed, ad libitum, on a coumermycin-supplemented ration. In the test, ten-day old Peterson Cross broiler strain chicks were used. Replicate groups, each of ten birds (5 pullets and 5 cockerels) were permitted access to the ration. A planned random distribution of the replicates was made to equalize factors of heating, light and position. The birds were observed over a two-week period, with group weight being determined several times during the period and individual weights being determined at the end of the 14 days. Feed consumpton was also recorded and improvement in feed efficiency, as compared to the control, was calculated.

A control experiment was carried out simultaneously in the manner described in the preceding paragraph except that the chicks which were used in the control test were allowed to feed, ad libitum, on a ration which contained no coumermycin.

The table which follows summarizes the results of the experiment.

Supplement (grams/ton):
  Basal ------------------------------------ 0
  Coumermycin [2] -------------------------- 50
Two week gain,[1] grams:
  Basal ------------------------------------ 152.7
  Coumermycin ------------------------------ 175.5
Percent gain over basal:
  Coumermycin ------------------------------ 14.9
Percent improved feed efficiency:
  Coumermycin ------------------------------ 8.1

[1] Average of thirty chicks.
[2] Monosodium Salt of Coumermycin $A_1$.

From the foregoing table it is seen that the chickens which were fed on the ration which was supplemented with a ratio of 50 grams of the monosodium salt of coumermycin $A_1$ per ton of feed experienced an increased growth rate as compared to the control. At the same time, as indicated by an 8.1 percent improvement in feed efficiency, the same birds made more effective use of their feed.

EXAMPLE 2

The experiment described in Example 1 including the control was repeated several times using the same basal ration as was employed in Example 1 therein. In these trials the level of coumermycin was varied. In one test the chickens (three replicates of ten birds) were allowed to feed on a ration supplemented with 20 grams of the monosodium salt of coumermycin $A_1$ per ton of feed. In a second test three replicates of ten birds were allowed to feed on a ration which was supplemented with 5 grams of the monosodium salt of coumermycin $A_1$ per ton of feed. This study was repeated to confirm the results. In another test three replicates of ten birds were allowed to feed on a basal ration which was supplemented with 1.0 gram/ton of the monosodium salt of coumermycin $A_1$. This study was replicated three times. In all tests growth rate over a two week period was observed in comparison to a control group run concurrently containing three replicates of ten birds each, which utilized a basal ration which contained no mono-sodium salt of coumercyin. Feed consumption was also recorded and improvement in feed efficiency in comparison to control was calculated.

The results set forth in the table demonstrate presence of 20 grams, 5 grams and 1 gram of the monosodium salt of coumermycin $A_1$ per ton of feed brings about an improvement in the growth rate of the poultry as compared to control. The results also show that an enhancement in feed efficiency occurs when chickens are fed a ration which contains a coumermycin component.

EXAMPLE 3

In this example experiments were carried out to ascertain the effect on growth rate and feed efficiency on chickens which were permitted to feed on a ration containing a freeze-dried crude fermentation broth of coumermycin.

The cude fermentation broth of coumermycin was prepared as follows:

2 liters of 4 day old shake flask inoculum strain A5–11C of *Streptomyces hazeliensis* was grown in an aqueous medium containing 3 percent by weight yellow split peas, 0.1 percent by weight potassium hydrogen phosphate, 0.1 percent by weight calcium carbonate, 0.5 percent by weight lard oil and 0.77 mg. per gallon anhydrous cobalt chloride on a rotary shaker at 180 r.p.m. at 28° C. It was then transferred to a 100 gallon capacity stainless steel tank containing 60 gallons of the same medium plus 0.01 percent by weight of a commercial paste of a polydimethylsiloxane as a foam suppressant.

As the fermentation progressed, a total of 1 percent by weight additional lard oil was added in 12 increments as both a foam control adjunct and as a nutrient. The tank was operated at 28° C., 250 r.p.m. shaft speed and an airflow rate of 5 c.f.m. Harvesting was carried out 167 hours after inoculation. Eight liters of unfiltered broth was frozen in shallow layers in stainless steel trays and freeze dried. These solids were homogenized and found to contain by cup-plate bioassay against *Staphylococcus aureus* 4.3 mg. of coumermycin $A_1$ per gram of solids.

Weighed, day-old broiler strain chicks were assembled into uniform groups of 6 each (3 females and 3 males) based on body weight. Eight replicates of 6 birds each were fed ad libitum a high energy commercial broiler starter ration such as described in Example 1 free of antibiotics. Six replicates of 6 birds each were fed ad libitum the same basal ration to which had been added 7.58 grams of the freeze-dried coumermycin solids described above per kilogram. Based on the microbiological assay of the solids (4.3 mg. coumermycin $A_1$/g. of solids), the equivalent of 32.5 mg./kg. of coumermycin $A_1$ was fed. All groups were randomly distributed and housed in electrically heated, thermostatically controlled batteries with raised wire floors. Feed intake was recorded over a two-week test period at the end of which the birds were

| Feed | No birds | Initial weight (average), g. | 2-week weight (average), g. | 2-week gain (average), g. | Percent gain (average) | Feed intake (average), g. | Feed efficiency | Percent improved feed efficiency |
|---|---|---|---|---|---|---|---|---|
| Basal ration | 48 | 39 | 188 | 149 | 100 | 225 | 1.51 | |
| Basal ration plus coumermycin solids (32.5 mg./kg.) | 36 | 39 | 205 | 166 | 111.4 | 231 | 1.39 | +8.6 |

The results of these experiments are set forth in the table which follows.

| Supplement (grams/ton) | | Two-week gain,[2] grams | | Percent gain over basal with coumermycin | Percent improved feed efficiency with coumermycin |
|---|---|---|---|---|---|
| Basal | Coumermycin [1] | Basal | Coumermycin | | |
| 0 | 20 | 134.3 | 146.7 | 9.2 | 2.5 |
| 0 | 5 | 129.2 | 146.7 | 13.5 | 6.4 |
| 0 | 5 | 152.7 | 167.4 | 9.6 | 3.5 |
| 0 | 1 | 135.9 | 141.4 | 3.8 | 5.9 |
| 0 | 1 | 166.5 | 179.6 | 7.9 | 5.2 |
| 0 | 1 | 144.9 | 160.2 | 10.6 | 0.9 |

[1] Monosodium salt of coumermycin $A_2$.
[2] Average of thirty chicks.

weighed. The table summarizes the results of the experiment.

From the foregoing table it is noted that the chicks which were fed on the basal ration supplemented with 32.5 mg./kg. freeze-dried coumermycin crude fermentation broth solids experienced an increased growth rate as compared to the control group which was fed only the basal ration. At the same time, as indicated by an 8.1 percent improvement in feed efficiency, the same birds made more effective use of their feed.

EXAMPLE 4

In this example experiments were carried out to ascertain the effect on growth rate and feed efficiency on chickens which were permitted to feed on a ration containing the monosodium salt of coumermycin $A_1$ with and without N-methyl-glucamine. In one control experiment a ration was used which contained no coumermycin and no N-methyl-glucamine. In a second control experiment a ration was used which contained N-methyl-glucamine and no coumermycin.

The test method employed was precisely the same as that described in Example 1. In the first control experiment a ration was used which contained neither coumermycin nor N-methyl-glucamine. In the second experiment the ration was supplemented with 50 grams per ton of coumermycin and 200 grams per ton of N-methyl-glucamine. In the third experiment the rations were supplemented with 50 grams per ton of coumermycin. In the fourth experiment (second control) the ration was supplemented with 200 grams per ton of N-methyl-glucamine. In all four experiments, the ration used was the same as the ration described in Example 1. In each experiment three replicates of ten birds were used.

The results are set forth in the table which follows:

| Supplement | Level grams/ ton of feed | Initial weight in grams | Two-week weight in grams | Weight gain in grams | Percent gain | Feed intake (two weeks) grams | Feed efficiency | Feed efficiency, percent improvement |
|---|---|---|---|---|---|---|---|---|
| None | | 39.3 | 158.7 | 119.4 | 100 | 180.3 | 1.51 | |
| Coumermycin [1] Plus NMG | 50<br>200 | 39.4 | 179.7 | 140.3 | 117.8 | 202.0 | 1.44 | 4.9 |
| Coumermycin [1] | 50 | 39.8 | 178.2 | 138.4 | 116.1 | 200.7 | 1.45 | 4.1 |
| NMG | 200 | 39.3 | 162.4 | 123.1 | 103.1 | 185.9 | 1.51 | 0 |

[1] Monosodium salt of coumermycin $A_1$. NMG = N-methyl-glucamine.

From the foregoing it is clear that the monosodium salt of coumermycin $A_1$, either alone or in admixture with N-methylglucamine, produces an improvement in growth rate when fed to chickens. Furthermore, there was a marked enhancement in feed efficiency when coumermycin, either alone or in admixture with N-methyl-glucamine, was present in the feed.

What is claimed is:

1. A method for stimulating the growth of poultry which comprises feeding to poultry, ad libitum, a poultry feed which contains in each ton of feed a sufficient quantity of a coumermycin active substance selected from the group consisting of (a) coumermycin free acid;
(b) a salt of coumermycin free acid with a medicinally acceptable base;
(c) dried coumermycin crude fermentation broth; or
(d) a mixture of (a), (b) or (c) with N-methyl-glucamine or with a salt thereof with a medicinally acceptable acid to provide from about 1.0 gram to about 50.0 grams of coumermycin.

2. The method according to claim 1 wherein said coumermycin active substance is coumermycin $A_1$ free acid.

3. The method according to claim 1 wherein said coumermycin active substance is dried coumermycin crude fermentation broth.

4. The method according to claim 1 wherein said coumermycin active substance is an alkali metal salt of coumermycin $A_1$.

5. The method according to claim 4 wherein N-methyl-glucamine is also present.

References Cited

Goldberg: Antibiotics, D. Van Nostrand C. Inc., Princeton, N.J., 1959, pp. 177–180.

Derwent Farmdoc No. 26,344, published Feb. 27, 1967, pp. 457–468.

STANLEY J. FRIEDMAN, Primary Examiner

PO-1050
(5/69)

UNITED STATES PATENT OFFICE
CERTIFICATE OF CORRECTION

Patent No. 3,662,063          Dated May 9, 1972

Inventor(s) Julius Berger and Wilbur Lewis Marusich

It is certified that error appears in the above-identified patent and that said Letters Patent are hereby corrected as shown below:

Claim 1, Column 8, line 9, "a mixture of (a)" should be a mixture of one part by weight of (a)

Claim 1, Column 8, line 9, "(c) with N-methyl" should be (c) with from about 0.1 to about 50 parts by weight of N-methyl Signed and sealed this 24th day of April 1973.

(SEAL)
Attest:

EDWARD M. FLETCHER, JR.
Attesting Officer

ROBERT GOTTSCHALK
Commissioner of Patents